United States Patent
Tsai et al.

(10) Patent No.: US 6,548,621 B1
(45) Date of Patent: Apr. 15, 2003

(54) SYNTHESIS OF POLY (IMIDE-BENZOXAZOLE) COPOLYMER

(75) Inventors: Shih-Jung Tsai, Hsinchu (TW); Steve Lien-Chung Hsu, Tainan (TW); Yuan-Pin Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/986,407

(22) Filed: Nov. 8, 2001

(30) Foreign Application Priority Data

Oct. 25, 2001 (TW) ........................ 90126367 A

(51) Int. Cl.⁷ ........................ C08G 73/00; C08G 69/00; C08G 73/18
(52) U.S. Cl. ........................ 528/170; 528/310; 528/312; 528/314; 528/316; 528/317; 528/318; 528/322; 528/350; 528/351; 528/353; 524/717; 524/726; 428/357; 428/473.5
(58) Field of Search ................ 528/310, 322, 528/170, 353, 312, 314, 316, 317, 318, 350; 428/357, 473.5; 524/717, 726

(56) References Cited

U.S. PATENT DOCUMENTS 4,978,733 A * 12/1990 Khanna ........................ 528/170
5,071,948 A * 12/1991 Khanna ........................ 528/331
5,741,585 A * 4/1998 Harris et al. ................. 428/357
5,919,892 A * 7/1999 Hwang et al. ............... 528/220
5,985,969 A * 11/1999 Harris et al. ................. 524/233

FOREIGN PATENT DOCUMENTS

WO    WO 96/36204    * 11/1996

* cited by examiner

Primary Examiner—P. Hampton-Hightower
(74) Attorney, Agent, or Firm—Sughrue Mion, PLLC

(57) ABSTRACT

The invention provides a poly(imide-benzoxazole) (PIBO) copolymer prepared from a trimellitic anhydride halide monomer and a bis(o-diaminophenol) monomer. The PIBO copolymer is characterized by the following recurring unit:

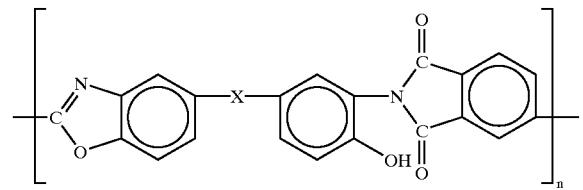

wherein X is —O—, —S—, —C(CF$_3$)$_2$—, —C(CH$_3$)$_2$—, —CO—, —CH$_2$—, —SO$_2$—, —SO—, or deleted; and n is an integer. The PIBO copolymers of this invention are particularly useful as dielectric layers in semiconductor devices because they possess hydroxyl groups which create better adhesion to semiconductor substrates.

27 Claims, No Drawings

SYNTHESIS OF POLY (IMIDE-BENZOXAZOLE) COPOLYMER

BACKGROUND OF THE INVENTION

1. Field of the Invention

The present invention relates to poly(imide-benzoxazole) (PIBO) copolymers, to precursors of PIBO, and to films, coatings, fibers, adhesives and engineering plastics of PIBO.

2. Description of the Related Arts

Semiconductors are making rapid progress in capacity, density, integration and surface mounting. Along with this progress, a number of problems are arising in production of semiconductor devices. One of the problems is that the heat or thermal stress applied to a semiconductor chip at the time of surface mounting becomes more severe as the sealing material becomes thinner. Hence, it is necessary to protect the fine semiconductor circuits from heat or thermal stress. Meanwhile, in order to form circuits of high density and integration on a semiconductor chip, the technique of multi-layer wiring is indispensable. To achieve it, there is required an interlayer dielectric having high heat resistance, high adhesion and low dielectric constant.

It is known that the above problems can be solved by using aromatic polyimide (PI) or polybenzoxazole (PBO) as a passivation film, a buffer coat film, or an interlayer heterocyclic polymers with excellent thermal stability, high mechanical properties, good electrical properties, and superior chemical resistance. Films of polybenzoxazole here a lower moisture uptake than that of polyimide, but poor adhesion to silicon wafers, thus causing peeling problems. To improve the adhesion, polybenzoxazole can be modified by the incorporation of polyimide to form a polybenzoxazole-polyimidie copolymer.

The synthesis of the poly(imide-benzoxazole) (PIBO) copolymers has been disclosed in U.S. Pat. No. 5,071,948 to Khanna, and U.S. Pat. No. 5,985,969 to Harris et al. In these patents, PIBO copolymers are prepared through the condensation reaction of a pre-synthesized diamine monomer containing benzoxazole moiety with a dianhydride monomer or a pre-synthesized diacid chloride monomer containing imide moiety with a bis(o-aminophenol) monomer. These synthetic methods involve complex monomer synthesis and purification procedures, which are tedious and expensive. It also should be noted that none of these patents disclose a PIBO copolymer that contains hydroxyl (—OH) groups to improve adhesion to semiconductor substrates.

SUMMARY OF THE INVENTION

In view of the above disadvantages, an object of the invention is to provide a poly(imide-benzoxazole) (PIBO) copolymer which can be prepared directly from commercially available monomers.

Another object of the invention is to provide a PIBO copolymer that contains hydroxyl groups and a PIBO film produced therefrom that exhibits improved adhesion to semiconductor substrates.

A further object of the invention is to provide a precursor of the above PIBO copolymer and a precursor solution containing such precursor.

To achieve the above objects, there is provided a precursor of poly(imide-benzoxazole) prepared by polycondensation of a trimellitic anhydride halide monomer and a bis(o-diaminophenol) monomer, which comprises the following recurring unit:

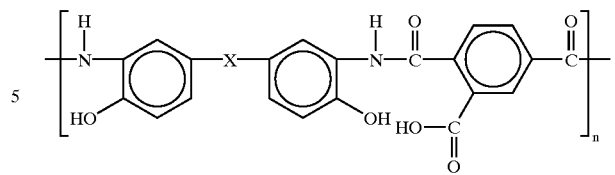

wherein

X is —O—, —S—, —C(CF$_3$)$_2$—, —C(CH$_3$)$_2$—, —CO—, —CH$_2$—, —SO$_2$—, —SO—, or deleted; and n is an integer, generally from about 10 to about 1000.

By heating the above precursor at temperatures sufficient to effect cyclodehydration, a PIBO copolymer is afforded with the following recurring unit:

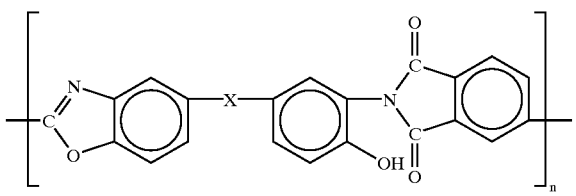

wherein X and n are as set forth above.

In this invention, PIBO copolymers can be prepared directly from commercially available monomers in a one-pot reaction.

DETAILED DESCRIPTION OF THE INVENTION

In the present invention, poly(imide-benzoxazole) copolymers are prepared directly from a trimellitic anhydride halide monomer and a bis(o-diaminophenol) monomer. A representative synthetic scheme is illustrated below:

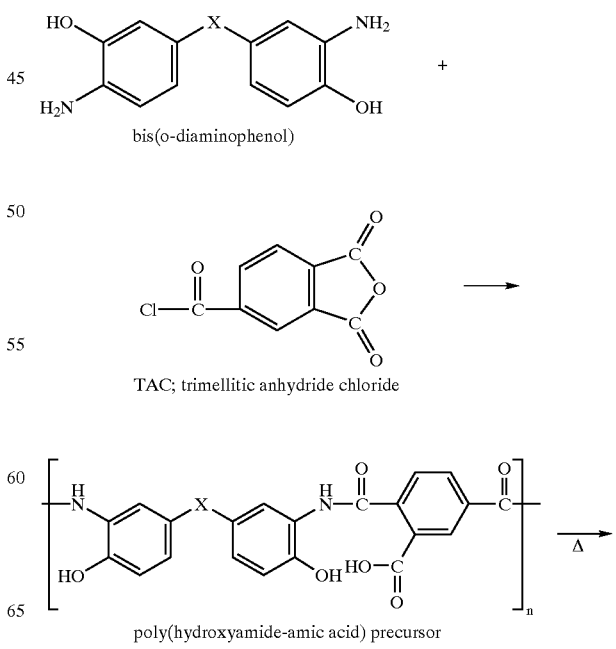

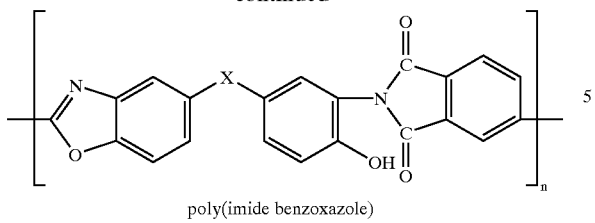

poly(imide benzoxazole)

wherein X is —O—, —S—, —C(CF$_3$)$_2$—, —CO—, —CH$_2$—, —SO$_2$—, —SO—, or deleted; and n is an integer generally from about 10 to about 1000, preferably from 20 to about 200.

A poly(hydroxyamide-amic acid) precursor is first synthesized by low-temperatures solution polymerization in an organic solvent. Preferably, the bis(o-diaminophenol) monomer is dissolved in an organic solvent first and the trimellitic anhydride halide monomer is added thereto to react with the bis(o-diaminophenol) monomer. It is found that a higher inherent viscosity can be obtained when the trimellitic anhydride halide is added in a solid state than in a solution state. This may be due to the trimellitic anhydride halide's moisture sensitivity reacting with moisture in the solvent and in the atmosphere. Organic solvents useful in this reaction include N-methylpyrrolidinone (NMP), pyridine, acetone, tetrahydrofuran (THF), dimethyl formamide (DMF), and mixtures thereof. The reaction is preferably conducted under substantially anhydrous conditions and at a temperature from about 15° C. to −15° C., preferably from about 0° C. to −5° C. The most preferred trimellitic anhydride halide monomer is trimellitic anhydride chloride, and the most preferred bis(o-diaminophenol) monomer is 2,2-bis(3-amino-4-hydroxyphenol) hexafluoropropane (i.e., X=—C(CF$_3$)$_2$—), which are both commercially available.

In addition to the trimellitic anhydride halide and bis(o-diaminophenol), the polymer precursor may optionally be prepared using one or more other monomers, for example, a diacid dichloride such as terephthaloyl chloride or M-phthaloyl chloride. The optionally employed monomers may be added to the reaction mixture prior to or during the reaction of the trimellitic anhydride halide and bis(o-diaminophenol). A representative synthetic scheme including copolymerization of a diacid dichloride is as follows:

wherein
X and n are as set forth above,
Ar is

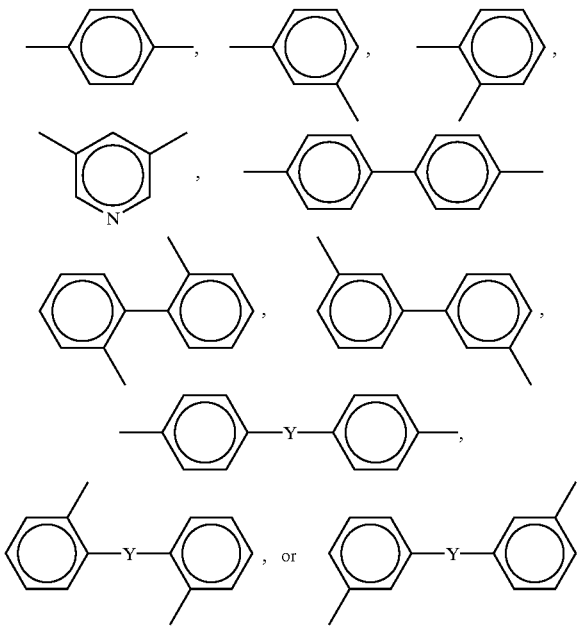

where Y is —O—, —S—, —C(CF$_3$)$_2$—, —C(CH$_3$)$_2$—, —CO—, —CH$_2$—, —SO$_2$—, or —SO—; and m is an integer, and m+n is generally from about 10 to about 1000, preferably from about 20 to about 200.

Following preparation of the poly(hydroxyamide-amic acid) precursor, the precursor, generally without subsequent isolation, is exposed to conditions to afford the corresponding poly(imide-benzoxazole). In general, the polyimide precursor is simply heated to a temperature sufficient to cause dehydrative cyclization to form the benzoxazole ring and the imide ring. The temperature is preferably in a range from about 100° C. to 450° C., and more preferably from about 300° C. to 400° C.

In general, the poly(hydroxyamide-amic acid) precursors of this invention are soluble in common organic solvents,

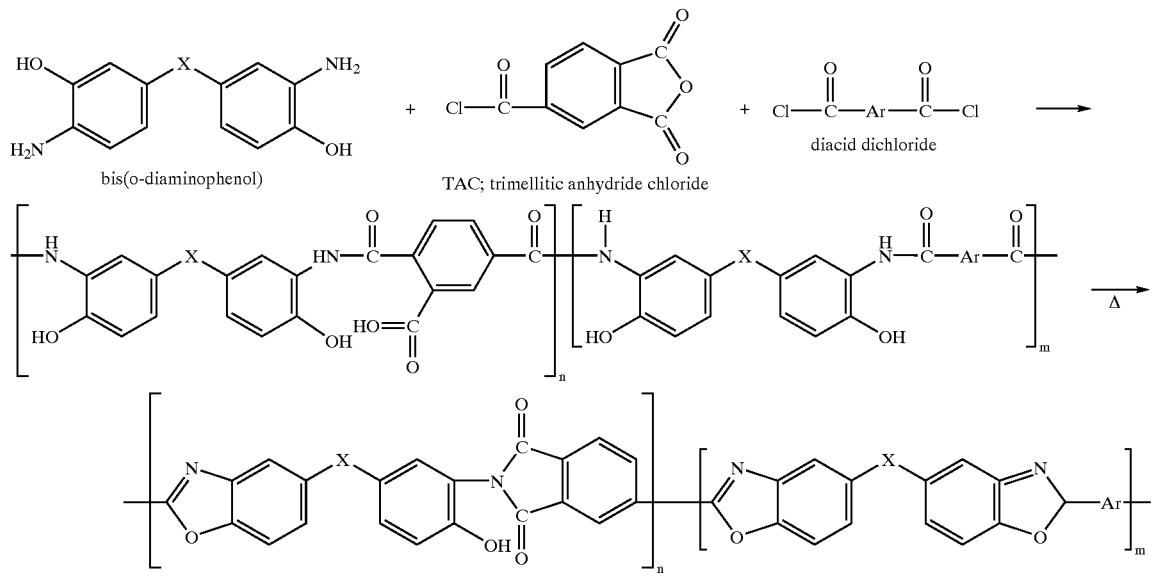

whereas the derivative poly(imide-benzoxazole) are not. Thus, in preparing PIBO articles, a precursor solution containing the poly(hydroxyamide-amic acid) precursor is formed into the desired shape of the finished product such as a film, a fiber or other article using conventional techniques before substantial conversion of the precursor to PIBO.

The PIBO copolymers of the invention may be cast into films useful as printed circuit backings, insulating dielectric layers and other applications where tough, flexible, high temperature stable films having good dielectric properties have been used in the past. In particular, the PIBO copolymers are useful as dielectric layers in semiconductor devices because they possess hydroxyl groups which can create better adhesion to semiconductor substrates such as silicon wafers.

The PIBO copolymers of this invention may be used as engineering plastics, molded using standard techniques such as compression molding or injection molding to produce melt-fabricated articles such as safety masks, windshields, electronic circuit substrates, or the like. They may also be compounded with fibers such as glass, graphite or boron fibers to produce molding compounds for high strength structural components such as jet engine components.

The PIBO polymers may be used as coatings on substrates such as aluminum or silicone dioxide. They are also useful to produce high temperature coatings for magnetic wire, dip coatings for various electronic components, protective coatings over glass, metal and plastic substrates, and photoresist coatings useful in microelectronic processing.

The PIBO polymers may also be used to produce high temperature adhesives for bonding electrical circuitry, conductive adhesives when mixed with conductive fillers such as silver or gold for microelectronic applications, or adhesives for glass, metal or plastic substrates. The PIBO copolymers of this invention may be melt spun to form fibers and filaments.

The polymers may also be used as varnish compositions or matrix resins to produce composites and laminates. The varnish compositions and matrix resins may be used to impregnate glass cloth, or graphite or boron fibers, for the production of printed circuit boards or other structural components requiring high temperature performance, non-flammability and excellent electrical properties.

Without intending to limit it in any manner, the present invention will be further illustrated by the following examples.

In these examples, 2,2-bis(3-amino-4-hydroxyphenol) hexafluoropropane (BisAPAF) was purchased from Chriskev Company. Trimellitic anhydride chloride was obtained from Aldrich Chemical Company and dried under vacuum at 60° C. for 24 hours before use. Anhydrous N-methylpyrrolidinone (NMP) and pyridine were obtained from Aldrich Chemical Company and used without further purification.

EXAMPLE 1

Precursor Synthesis

The poly(hydroxyamide amic acid) precursor was prepared by the following procedure. To a dry 250 mL three-necked flask equipped with a nitrogen inlet and mechanical stirrer were added 5.21 g (14.24 mmol) of 2,2-bis(3-amino-4-hydroxyphenol) hexafluoropropane (BisAPAF), 1.24 g (15.68 mmol) of pyridine and 50 g of NMP. After the BisAPAF was completely dissolved, the solution was cooled to 5° C. with ice water. 3 g (14.24 mmol) of trimellitic anhydride chloride was added slowly into the solution. After complete addition, the reaction mixture was stirred at room temperature for 16 hours. The resulting viscous solution was added dropwise to 1 liter of stirring water. The precipitated polymer was collected by filtration, washed with methanol, and then dried in a vacuum oven at 60° C. for 24 hours.

Preparation of Precursor Solution and PIBO Film 7 g of poly(hydroxyamide-amic acid) polymer powder was dissolved in 17 g of NMP to make a 26% (w/w) solution. A film was cast from the viscous solution on a glass plate by a scalpel. The film was dried at 120° C. for half an hour, and 400° C. for another half hour in a heating oven under nitrogen flow to convert the poly(hydroxyamide-amic acid) to poly(imide-benzoxazole). The film was yellow and transparent.

Table 1 below summarizes the qualitative solubility of the poly(hydroxyamide amic acid) precursor and the corresponding poly(imide-benzoxazole) film. The poly (hydroxyamide amic acid) precursor was soluble in many common organic solvents but the poly(imide-benzoxazole) did not dissolve in any of the organic solvents. Therefore, the poly(imide-benzoxazole) polymer should be processed in the precursor state and then converted to the final poly (imide-benzoxazole) state by heat.

TABLE 1

Solubility of Precursor and Corresponding PIBO Film

| Solvent | Precursor | PIBO Film |
| --- | --- | --- |
| NMP | +* | −* |
| DMAC | + | − |
| DMF | + | − |
| THF | + | − |
| Acetone | + | − |
| Ethanol | − | 31 |

*+: Soluble
−: Insoluble

EXAMPLES 2–3

The same procedure as described in Example 1 was repeated, but additionally a diacid chloride monomer was incorporated with BisAPAF in the three-necked flask before adding trimellitic anhydride chloride.

Table 2 lists the monomers and amounts thereof used in Examples 1–3.

TABLE 2

| | Composition | Bis-APAF | Copolymer | | |
| --- | --- | --- | --- | --- | --- |
| | | | TAC | PPC | MPC |
| Ex. 1 | Mole ratio | 1 | 1 | — | — |
| | Weight (g) | 5.21 | 3 | — | — |
| Ex. 2 | Mole ratio | 1 | 0.5 | 0.5 | — |
| | Weight (g) | 5.21 | 1.5 | 1.45 | — |
| Ex. 3 | Mole ratio | 1 | 0.5 | — | 0.5 |
| | Weight (g) | 5.21 | 1.5 | — | 1.45 |

*TAC: trimellitic anhydride chloride
PPC: terephthaloyl chloride
MPC: M-phthaloyl chloride The thermal stability of the PIBO copolymers of Examples 1–3 was analyzed using a Seiko Exstar Model 6000 Thermogravimetric Analyzer (TGA) at a heating rate of 10° C./min under air and nitrogen. The figures of 5 wt % loss temperatures in Table 3 indicate the PIBO copolymers had excellent flame-retardant properties.

TABLE 3

| Polymer | 5 wt. % loss by TGA (° C.) | |
| --- | --- | --- |
| | Nitrogen | Air |
| Ex. 1 | 530 | 525 |
| Ex. 2 | 553 | 544 |
| Ex. 3 | 558 | 549 |

While the invention has been particularly shown and described with reference to the preferred embodiment thereof, it will be understood by those skilled in the art that various changes in form and details may be made without departing from the spirit and scope of the invention.

What is claimed is:

1. A precursor of poly(imide-benzoxazole) prepared by reacting a trimellitic anhydride halide monomer and a bis(o-diaminophenol) monomer, comprising the following recurring unit:

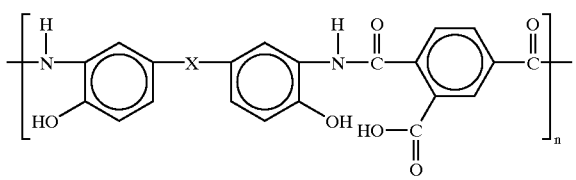

wherein

X is —O—, —S—, —C(CF$_3$)$_2$—, —C(CH$_3$)$_2$—, —CO—, —CH$_2$—, —SO$_2$—, —SO—, or a chemical bond; and n is an integer from about 10 to about 1000.

2. The precursor as claimed in claim 1, which is a reaction product of trimellitic anhydride chloride and a bis(o-diaminophenol) monomer.

3. The precursor as claimed in claim 1, which is a reaction product of trimellitic anhydride chloride and 2,2-bis(3-amino-4-hydroxyphenol)hexafluoropropane.

4. The precursor as claimed in claim 1, wherein X is —C(CF$_3$)$_2$—.

5. The precursor as claimed in claim 1, further comprising the following repeating unit:

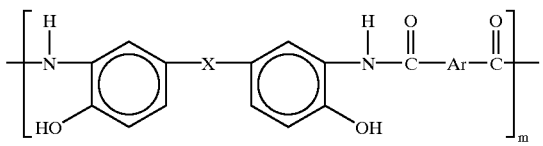

wherein

X has the meaning as claimed in claim 1;

Ar is

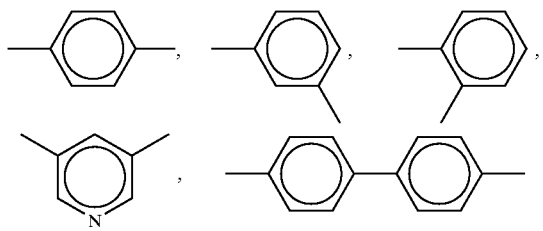

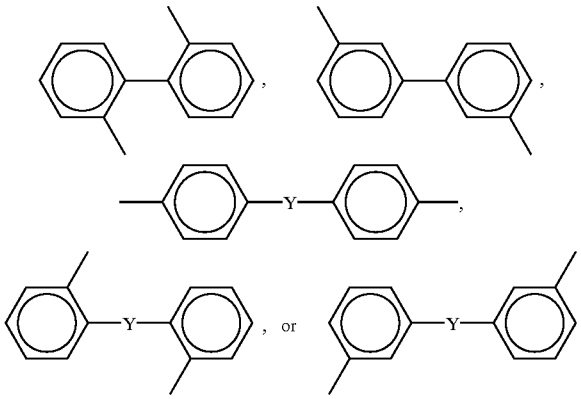

where Y is —O—, —S—, —C(CF$_3$)$_2$—, —C(CH$_3$)$_2$—, —CO—, —CH$_2$—, —SO$_2$—, or —SO—; and m is an integer, and m+n=10–1000.

6. The precursor as claimed in claim 5, which is a reaction product of trimellitic anhydride chloride, a bis(o-diaminophenol) monomer, and a diacid dichloride monomer.

7. The precursor as claimed in claim 5, wherein X is —C(CF$_3$)$_2$—, and Ar is

8. The precursor as claimed in claim 5, wherein X is —C(CF$_3$)$_2$—, and Ar is

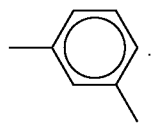

9. A poly(imide-benzoxazole) precursor solution comprising the precursor of claim 1.

10. A poly(imide-benzoxazole) precursor solution comprising the precursor of claim 5.

11. A poly(imide-benzoxazole) copolymer, comprising the following recurring unit:

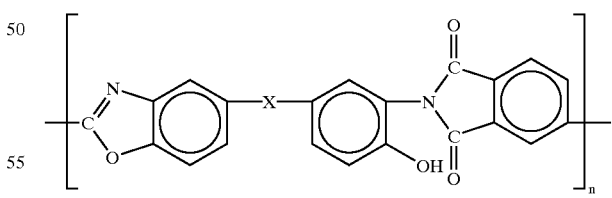

wherein

X is —O—, —S—, —C(CF$_3$)$_2$—, —C(CH$_3$)$_2$—, —CO—, —CH$_2$—, —SO$_2$—, —SO—, or a chemical bond; and n is an integer from about 10 to about 1000.

12. The poly(imide-benzoxazole) copolymer as claimed in claim 11, wherein X is —C(CF$_3$)$_2$—.

13. The poly(imide-benzoxazole) copolymer as claimed in claim 11, further comprising the following recurring unit:

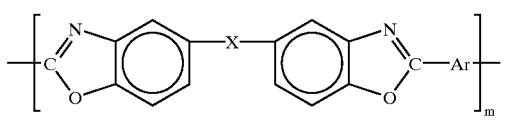

wherein
X has the meaning as claimed in claim 11;
Ar is

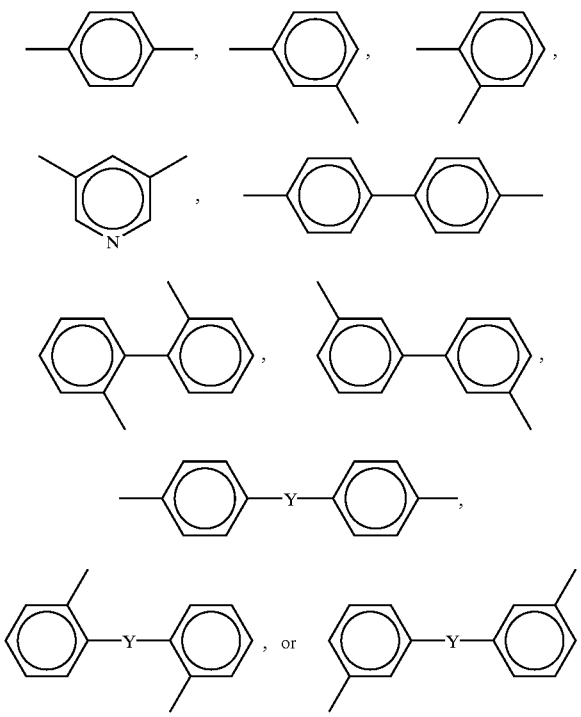

where Y is —O—, —S—, —C(CF$_3$)$_2$—, —C(CH$_3$)$_2$—, —CO—, —CH$_2$—, —SO$_2$—, or —SO—; and
m is an integer, and m+n=10–1000.

14. The poly(imide-benzoxazole) copolymer as claimed in claim 13, wherein X is —C(CF$_3$)$_2$—, and Ar is

15. The poly(imide-benzoxazole) copolymer as claimed in claim 13, wherein X is —C(CF$_3$)$_2$—, and Ar is

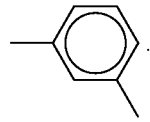

16. A dried film that has been heat treated comprising the poly(imide-benzoxazole) copolymer of claim 11.

17. A dried film that has been heat treated comprising the poly(imide-benzoxazole) copolymer of claim 13.

18. A film prepared from the poly(imide-benzoxazole) precursor solution of claim 9.

19. A film prepared from the poly(imide-benzoxazole) precursor solution of claim 10.

20. A coating composition prepared from the poly(imide-benzoxazole) precursor solution of claim 9.

21. A coating composition prepared from the poly(imide-benzoxazole) precursor solution of claim 10.

22. An adhesive prepared from the poly(imide-benzoxazole) precursor solution of claim 9.

23. An adhesive prepared from the poly(imide-benzoxazole) precursor solution of claim 10.

24. A fiber prepared from the poly(imide-benzoxazole) precursor solution of claim 9.

25. A fiber prepared from the poly(imide-benzoxazole) precursor solution of claim 10.

26. A plastic prepared from the poly(imide-benzoxazole) precursor solution of claim 9.

27. A plastic prepared from the poly(imide-benzoxazole) precursor solution of claim 10.

* * * * *